United States Patent
Kim et al.

(10) Patent No.: US 8,821,346 B2
(45) Date of Patent: Sep. 2, 2014

(54) CLUTCH ACTUATOR UNIT

(71) Applicants: Hyundai Motor Company, Seoul (KR); Pyeong Hwa Valeo Co., Ltd., Dae-Gu (KR); Motonic Corporation, Seoul (KR); Keyang Electric Machinery Co., Ltd., Seoul (KR)

(72) Inventors: Taewon Kim, Seoul (KR); Yeonho Kim, Gyeonggi-do (KR); Hee Ra Lee, Gyeonggi-do (KR); Baekyu Kim, Gyeonggi-do (KR); Junglyung Choi, Daegu (KR); Myung-Kweon Kang, Daegu (KR); Wookyo Jang, Gyeonggi-do (KR); Yoon-Sub So, Gyeonggi-do (KR); Jinho Jang, Gyeonggi-do (KR); Namhun Lee, Gyeonggi-do (KR); Man-Dae Hur, Daegu (KR); Hongcheol Moon, Daegu (KR); Chang-Hwa Kim, Busan (KR)

(73) Assignees: Hyundai Motor Company, Seoul (KR); Pyeong Hwa Valeo Co., Ltd., Dae-Gu (KR); Motonic Corporation, Seoul (KR); Keyang Electric Machinery Co., Ltd., Seoul (KR)

(*) Notice: Subject to any disclaimer, the term of this patent is extended or adjusted under 35 U.S.C. 154(b) by 0 days.

(21) Appl. No.: 13/730,178

(22) Filed: Dec. 28, 2012

(65) Prior Publication Data
US 2014/0048378 A1  Feb. 20, 2014

(30) Foreign Application Priority Data
Aug. 20, 2012 (KR) .................. 10-2012-0090928

(51) Int. Cl.
*B60W 10/02* (2006.01)
*F16D 23/00* (2006.01)

(52) U.S. Cl.
USPC ............. 477/174; 477/13; 192/113.5; 192/94

(58) Field of Classification Search
None
See application file for complete search history.

(56) References Cited

U.S. PATENT DOCUMENTS

| 4,287,972 A * | 9/1981 | Petrak .......................... 192/54.2 |
| 4,865,173 A * | 9/1989 | Leigh-Monstevens et al. ............................. 192/3.63 |
| 5,979,629 A * | 11/1999 | Asada et al. ............. 192/70.251 |
| 5,984,068 A * | 11/1999 | Reed, Jr. ...................... 192/84.6 |
| 2004/0020741 A1* | 2/2004 | Kapaan et al. ............... 192/84.6 |
| 2007/0023254 A1* | 2/2007 | Samra .............................. 192/98 |

* cited by examiner

*Primary Examiner* — Gene Crawford
*Assistant Examiner* — Mark Manley
(74) *Attorney, Agent, or Firm* — Edwards Wildman Palmer LLP; Peter F. Corless

(57) ABSTRACT

A clutch actuator unit is provided that includes a housing having a mounting space and a penetration aperture for receiving an operating rod. A slide pad and slider are disposed along an inner side surface of the mounting space, and are configured to move back and forth within the housing. An operating rod that is connected to the slider through the penetration aperture is moved back and forth, along with the slider and slide pad, through the aperture via a drive portion. A stopper is also integrally formed along the front surface of the slide pad to limit the movement of the slider accordingly. In doing so, the disclosed actuator is able to dynamically locate certain stroke positions and provide an improved shifting operation.

6 Claims, 7 Drawing Sheets

CLUTCH ACTUATOR UNIT

CROSS-REFERENCE TO RELATED APPLICATION

This application claims priority to and the benefit of Korean Patent Application No. 10-2012-0090928 filed in the Korean Intellectual Property Office on Aug. 20, 2012, the entire contents of which are incorporated herein by reference.

BACKGROUND OF THE INVENTION (a) Field of the Invention

The present invention relates to a clutch actuator unit that has a driving portion for operating a clutch and operates to selectively transmit inputted torque to a transmission.

(b) Description of the Related Art

Generally, transmissions are may be thought of as either manual or automatic. However, recently, semi-automatic transmissions and automated manual transmissions have begun to emerge on the market as well. In a vehicle with a semi-automatic transmission installed, a driver manually operates the transmission without a clutch pedal, i.e., through paddle shifting. In an automated manual transmission (AMT), the system uses electronic sensors, processors, and actuators to actuate gear shifts on the driver's command. This again removes the need for a clutch pedal while the driver is still able to determine when to change from one gear to the other. The clutch itself is actuated by electronic equipment that can synchronize the timing and the torque required to make gear shifts quick and smooth. These types of transmission improve the performance and convenience of conventional manual transmission.

In automated manual transmissions, a clutch actuator is designed to pull or push a transmission fork, which is used to engage or disengage power delivery between an engine and the transmission. This clutch actuator typically includes an air cylinder or a motor that is disposed at one end of an operating rod of the clutch actuator and pushes or pulls the operating rod that is connected to a release bearing.

Meanwhile, shifting and a ride comfort of a driver are varied depending on the stroke characteristic of the operating rod, and research is continually being conducted to improve these characteristics, control precision thereof, and durability of the actuator.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide clutch actuator unit which improves control precision and overall durability of the actuator by precisely locating certain stroke positions of an operating rod.

A clutch actuator unit according to an exemplary embodiment of the present invention may include a housing in which a mounting space is formed and a penetration aperture is formed between the outside and inside of the housing. A slide pad is disposed in a lengthwise/longitudinal direction along an inner side surface of the mounting space, and a slider is disposed in the mounting space that is configured to slide with an inner side surface of the slide pad and move back and forth thereon. An internal portion of an operating rod is connected to the slider through the penetration aperture and extends through the penetration hole to outside the housing. A drive portion moves the slider back and forth along with the operating rod to provide movement to the actuator. In particular, a stopper is integrally formed with the slider pad at a front end portion of the slide pad to limit the movement of the slider accordingly.

This stopper may be formed by bending the front end portion of the slide pad so as to be integrally formed as part of the slid pad structure. A lubricant pocket may be formed at an inner side surface of the slide pad that slides concurrently with the slider. The lubrication pocket may be, in some embodiments, disposed along a predetermined distance in a movement direction of the slider.

The slide pad may include a first member that is disposed at one side surface of the mounting space, and a second member that may be bent from the first member to be integrally formed therewith. Accordingly, the stopper may be formed with a front end portion of the first member and the lubrication pocket may be formed on the second member.

A fixation protrusion may protrude on one side of an outside surface of the slide pad, and a protrusion groove may be formed in the housing to be engaged with the fixation protrusion. The protrusion groove may be formed on a flange surface that is formed at of the rear of the housing.

The clutch actuator unit may further include a control portion (e.g., a controller) that controls the drive portion. This control portion detects a "key on" signal for starting an engine, detects a "kissing point" or a lock up point of a clutch by controlling the drive portion to move the operating rod accordingly, locates a base point where the slider is stopped by the stopper, and locates a predetermined initial point by pulling inward the operating rod.

The drive portion may include a lead screw that is disposed to be moved forward or backward longitudinally according to the rotating direction of a motor and the end portion thereof is connected to an internal portion of the operating rod. The internal portion of the operating rod is the end of the operating rod that is located inside of the housing.

As described above, a clutch actuator unit according to an exemplary embodiment of the present invention effectively locates a base point based on where the slider is stopped by the stopper. Further, a slider is stopped by a stopper, and therefore the slider does not direct apply stress on housing. Accordingly, the damage of the housing is prevented and the durability thereof is improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 1:
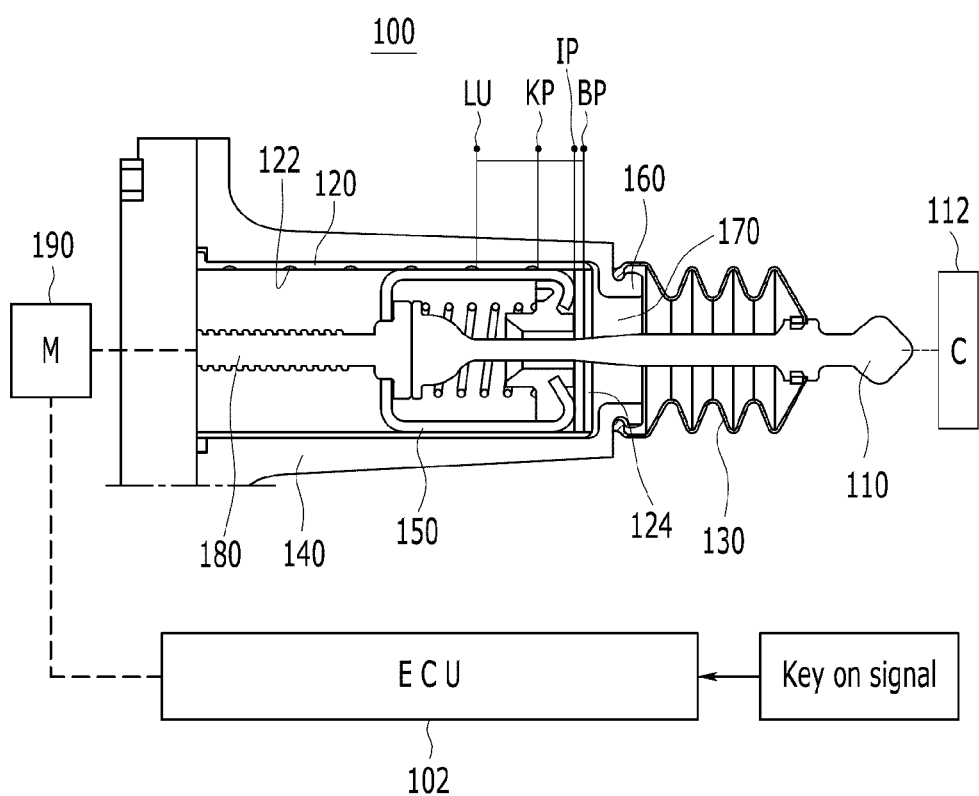
FIG. 1 is a cross-sectional view showing an overall clutch actuator unit according to an exemplary embodiment of the present invention.

100: actuator unit
102: control portion
110: operating rod
112: clutch
120: slide pad
122: lubricant pocket
124: stopper
130: bellows
140: housing
150: slider
160: bent portion
170: penetration aperture
180: lead screw
190: motor
300: first member
310: second member
320: fixation protrusion
600: mounting space
610: flange surface
620: protrusion groove It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a single control potion or controller, it is well understood that a plurality of the controllers may be utilized to perform the below operations without departing from the illustrative embodiment of the present invention. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

An exemplary embodiment of the present invention will hereinafter be described in detail with reference to the accompanying drawings.

FIG. 1 is a cross-sectional view showing an overall clutch actuator unit according to an exemplary embodiment of the present invention. Referring to FIG. 1, a clutch actuator unit 100 includes an operating rod 110, a bellows 130, a slide pad 120, a housing 140, a slider 150, a motor 190, a lead screw 180, and a control portion (e.g., an Engine Control Unit (controller)) 102. The clutch actuator unit 100 can be applied to a two-step transmission for an electric vehicle. However, the exemplary embodiment is not limited only to this application.

First, a mounting space (600, FIG. 6) is formed inside the housing 140 in a length direction thereof (L), and a penetration aperture 170 is formed at a front end portion thereof to be connected to the mounting space 600.

The slide pad 120 is disposed inside the mounting space 600 of the housing 140 in a length direction (L), and the slider 150 is disposed to be slid on the slide pad 120. Also, a lubricant pocket 122 may be formed on a surface of the slide pad 120.

A lead screw 180 may be connected to a rear side of the slider 150 and a front side of the slider 150 may be connected to the operating rod 110. In this regard, the lead screw 180 is moved back and forth by the motor 190 to actuate both the slider 150 and the operating rod 110 in unison.

Furthermore, one side of the bellows 130 may be engaged with a bent portion 160 that is formed on a circumference of the penetration aperture 170 of the housing 140. The other side thereof may be engaged with a groove portion of a circumference of the operating rod 110 so that foreign material cannot infiltrate into the housing 140 through the penetration aperture 170.

The control portion 102 is configured with programmable logic that detects "key on" signals and operates the motor 190 to move the slider 150 and the operating rod 110 in a back/forth direction via the lead screw 180. As stated above, the control portion 102 may be embodied as a controller installed in the vehicle. This controller may include a memory and a processor specifically configured to execute programmable logic that effectuates one or more processes to be performed by the actuator.

In particular, an initial point (IP), a kissing point (KP: clutch operation start point), and a lock up point (LU: clutch operation completion point) are set within the control portion 102 to accurately control the position of the front end portion of the slider 150 in an exemplary embodiment of the present invention.

The initial point (IP), the kissing point (KP), and the lock up point (LU) are points that are dynamically learned or compensated for depending on the condition of a clutch 112 and can be varied according to the most recent data received at the control portion 102. Notably, however, the base point (BP), which is determined by the location of stopper 124, pointing a fixed data point that never changes.

This stopper 124 is formed at a front end portion of the slide pad 120 and is configured to limit the movement of the slider 150. Accordingly, when a "key-on" signal is received by the control portion 102 in an exemplary embodiment of the present invention, the control portion 102 controls the motor 190 to move the slider 150 via the lead screw 180.

The control portion 102 then dynamically locates a kissing point (KP) or a lock-up point (LU) of the clutch 112. In doing so, the slider 150 is moved forward to locate the initial point (IP), wherein the slider 150 reaches a base point (BP) (i.e., where the slider is stopped by the stopper 124), and then the slider 150 is moved backward to locate an initial point (IP) accordingly.

Figure 2:
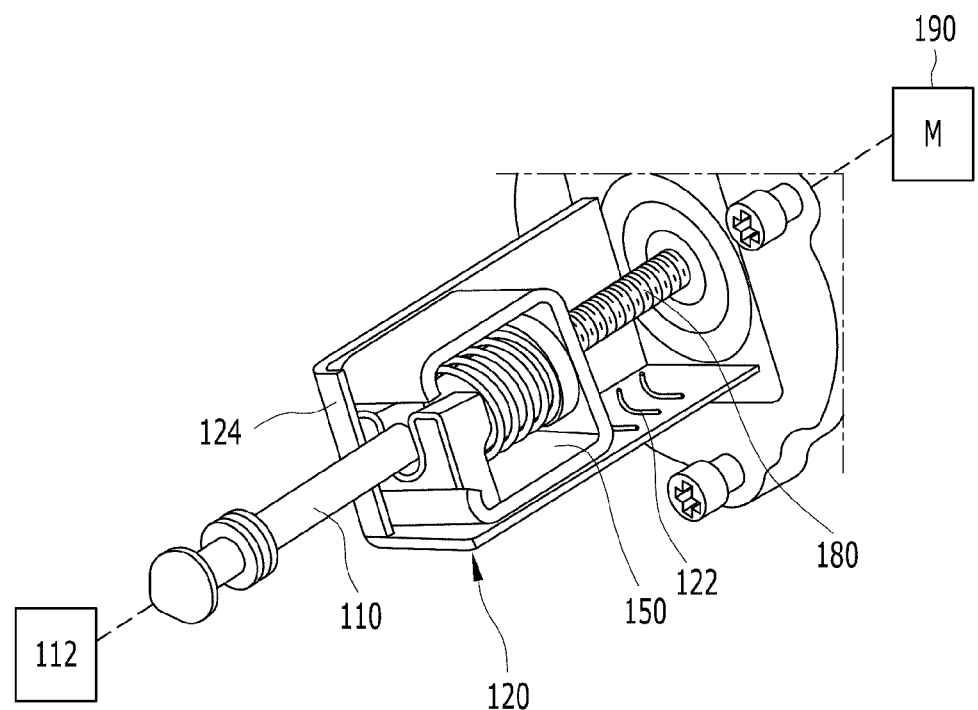
FIG. 2 is a partial exploded perspective view of a clutch actuator unit according to an exemplary embodiment of the present invention.

FIG. 2 is a partial exploded perspective view of a clutch actuator unit according to an exemplary embodiment of the present invention. Referring to FIG. 2, a plate member is bent to form the slider 150 having "U" or "C" shape, wherein one side surface of the slider 150 slides on the slide pad 120. Further, a lubricant pocket 122 may be formed on the slide pad 120 that contacts the slider 150. Also, a front end portion of the slide pad 120 is integrally bent to form the stopper 124.

Figure 3:
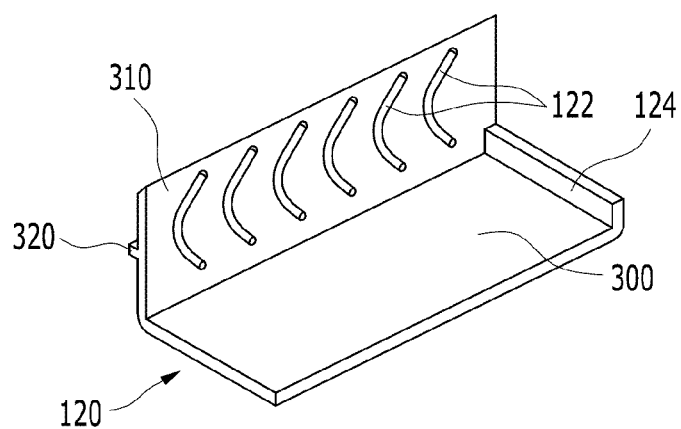
FIG. 3 is an inner perspective view of a slide pad that is disposed in a clutch actuator unit according to an exemplary embodiment of the present invention.
Figure 4:
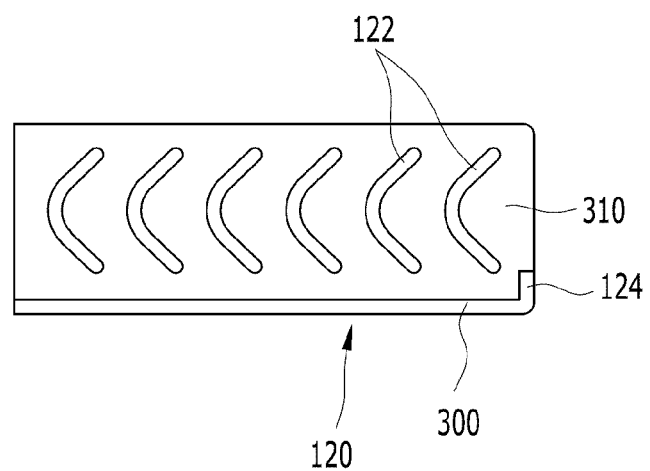
FIG. 4 is a side view of a slide pad according to an exemplary embodiment of the present invention.
Figure 5:
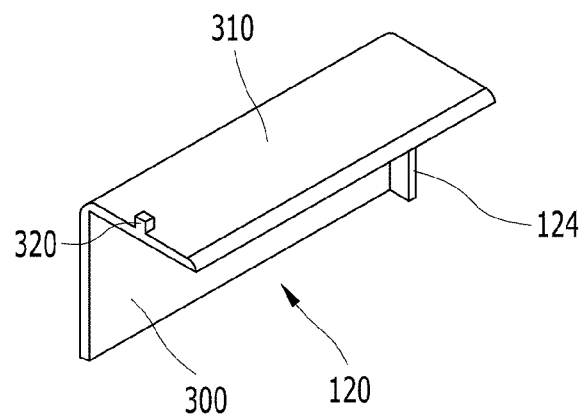
FIG. 5 is an outside perspective view of a slide pad according to an exemplary embodiment of the present invention.

Referring to FIGS. 3, 4 and 5, the structure of the slide pad will be further detailed. FIG. 3 is an internal perspective view of a slide pad that is disposed in a clutch actuator unit according to an exemplary embodiment of the present invention, FIG. 4 is a side view of a slide pad according to an exemplary embodiment of the present invention, and FIG. 5 is an outside perspective view of a slide pad according to an exemplary embodiment of the present invention.

Referring to drawings, the slide pad 120 includes a first member 300, a second member 310, and a stopper 124. The first member 300, the second member 310, and the stopper 124 can be integrally formed. The first member 300 is formed in the housing 140 along one side surface, and the second member 310 may be formed in the housing along an upper side surface (ceiling) of the housing 140. The first member 300 and the second member 310 can be integrally formed by bending a metal plate accordingly to form approximately a 90 degree angle. Further, the stopper 124 can be integrally formed by perpendicularly bending a front end portion of the first member 300.

As shown in drawings, the lubricant pocket 122 may be formed on an inner surface of the second member 310. This lubricant pocket 122 may be formed for a predetermined distance in a length direction of the slide pad 120.

A fixation protrusion 320 protrudes in a middle portion of a rear end portion of an outside surface of the second member 310. The fixation protrusion 320 is configured to be movably secured within an inner side portion of the housing 140.

Figure 6:
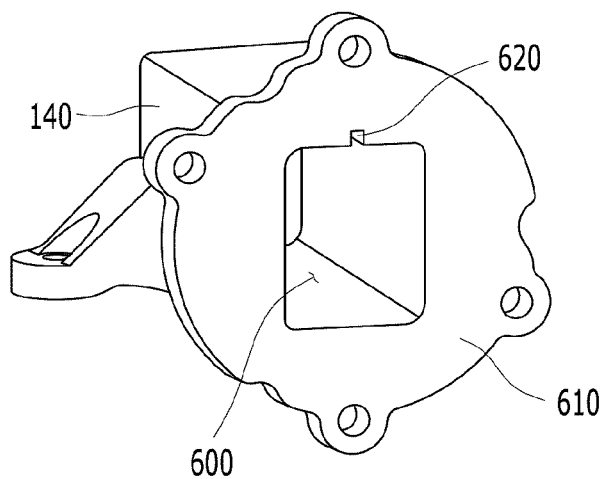
FIG. 6 is a backside perspective view of a housing that is disposed in a clutch actuator unit according to an exemplary embodiment of the present invention.

FIG. 6 is a backside perspective view of a housing that is disposed in a clutch actuator unit according to an exemplary embodiment of the present invention. Referring to FIG. 6, a plane flange surface 610 is formed at a rear end portion of the housing 140, an inlet that is connected to the mounting space 600 is formed in a middle portion of the flange surface 610, and a protrusion groove 620 is formed in an upper middle portion thereof.

Referring to FIG. 5 and FIG. 6, the fixation protrusion 320 of the slide pad 120 is engaged with the protrusion groove 620 that is formed at a rear end portion of the housing 140 such that the slide pad 120 is engaged with the mounting space 600 of the housing 140.

Figure 7:
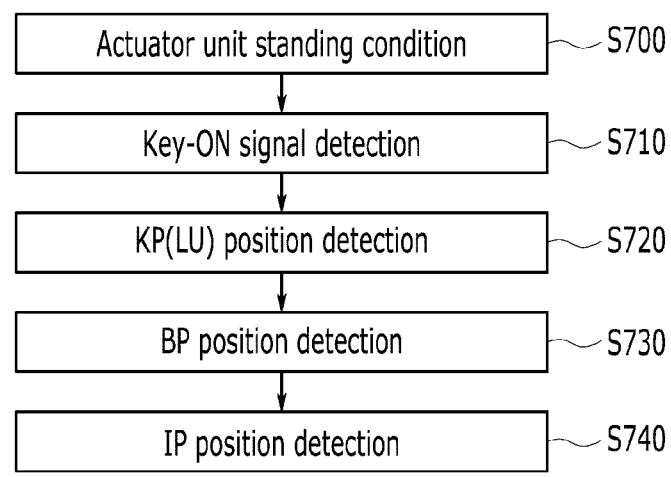
FIG. 7 is a flowchart showing a control method of a clutch actuator unit according to an exemplary embodiment of the present invention.

FIG. 7 is a flowchart showing a control method of a clutch actuator unit according to an exemplary embodiment of the present invention. Referring to FIG. 7, ECA (electric clutch actuator: 100) is ready S700, and the control portion 102 detects a "key on" signal S710. Once the "key on" signal is detected, a kissing point (KP) or a lock up point (LU) is detected S720. These points have been described above and are illustrated in FIG. 1. Therefore, description of these points will be omitted for brevity. The slider 150 is then moved forward to locate a base point (BP) S730. Finally, the slider 150 is moved backward to locate an initial point (IP) S740.

As described above, when a stroke of the operating rod 110 is dynamically obtained/learned in an electric clutch actuator unit 100, a base point (BP) can be effectively found through the operation that the slider 150 which is stopped by the stopper 124. Accordingly, overall accumulation error can be minimized Further, the movement of the slider 150 is stopped by the stopper 124, and therefore the slider 150 does not directly apply stress on the housing 140. Accordingly, the damage of the housing 140 is prevented beforehand and the durability thereof is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clutch actuator unit, comprising:
   a housing including a mounting space and a penetration aperture formed therein, the penetration aperture extending from the mounting space to outside the housing;
   a slide pad disposed in a length direction along an inner side surface of the mounting space;
   a slider disposed in the mounting space and configured to slide with an inner side surface of the slide pad and move back and forth thereon;
   an operating rod connected to the slider through the penetration aperture wherein an internal portion of the operating rod is connected to the slider and the operating rod extends outside the housing through the penetration aperture;
   a drive portion configured to operate the slider back and forth in unison with the operating rod;

a stopper integrally formed with the slide pad along a front surface of the slide pad to limit the movement of the slider wherein the stopper is bent from a front end portion of the slide pad and the slider is disposed to come in contact with the stopper when moving in one direction so that the slider does not apply stress on the housing; and a plurality of lubrication pockets formed along an inner side surface of the slide pad at intervals along a movement direction of the slider.

2. The clutch actuator unit of claim 1, wherein the slide pad includes a first member that is disposed at one side surface of the mounting space; and a second member that is bent from the first member to be integrally formed therewith, wherein the stopper is formed with a front end portion of the first member and the plurality of lubrication pockets are formed on the second member.

3. The clutch actuator unit of claim 1, wherein a fixation protrusion protrudes from one side of an outside surface of the slide pad, and a protrusion groove is formed in the housing to be engaged with the fixation protrusion.

4. The clutch actuator unit of claim 3, wherein the protrusion groove is formed in a flange surface that is formed at a rear end portion of the housing.

5. The clutch actuator unit of claim 1, further comprising a control portion that is configured to control the drive portion, wherein the control portion is configured to:
    detect a key on signal for starting an engine;
    detect a kissing point or a lock up point of a clutch by controlling the drive portion to move the operating rod;
    locate a base point that the slider is stopped by the stopper; and
    locate a predetermined initial point by moving rearward the operating rod.

6. The clutch actuator unit of claim 1, wherein the drive portion includes a lead screw that is disposed to be moved forward or backward along the length direction according to the rotating direction of a motor and an end portion thereof is connected to the internal portion of the operating rod.

* * * * *